United States Patent [19]
Djupsjöbacka

[11] Patent Number: 4,842,367
[45] Date of Patent: Jun. 27, 1989

[54] OPTOELECTRONIC DIRECTIONAL COUPLER FOR A BIAS-FREE CONTROL SIGNAL

[75] Inventor: Anders G. Djupsjöbacka, Solna, Sweden

[73] Assignee: Telefonaktiebolaget L M Ericsson, Stockholm, Sweden

[21] Appl. No.: 41,099

[22] Filed: Apr. 22, 1987

[30] Foreign Application Priority Data

May 16, 1986 [SE] Sweden .............................. 86022340

[51] Int. Cl.$^4$ ............................................... G02B 6/26
[52] U.S. Cl. ............................... 350/96.14; 350/96.15
[58] Field of Search ............... 350/96.11, 96.12, 96.13, 350/96.14, 96.15

[56] References Cited

U.S. PATENT DOCUMENTS

| | | | |
|---|---|---|---|
| 4,012,113 | 3/1977 | Kogelnik et al. | 350/96.13 |
| 4,166,669 | 9/1979 | Leonberger et al. | 350/96.14 |
| 4,251,130 | 2/1981 | Marcatili | 350/96.14 |
| 4,583,817 | 4/1986 | Papuchon | 350/96.14 |

FOREIGN PATENT DOCUMENTS

| | | | |
|---|---|---|---|
| 2533714 | 3/1984 | France | 350/96.14 |
| 52-32347 | 3/1977 | Japan | 350/96.14 |
| 56-147122 | 11/1981 | Japan | 350/96.14 |
| WO86/01907 | 3/1986 | PCT Int'l Appl. | |

OTHER PUBLICATIONS

Schmidt et al., "Electro-Optically Switched Coupler . . . LiNBO$_3$ Waveguides", *Appl. Phys. Lett.*, vol. 28, No. 9, May 1976, pp. 503–506.

Kogelnik et al., "Switched Directional Couplers with Alternating Δβ", *IEEE J. of Quantum Electronics*, vol. QE-12, No. 7, Jul. 1976, pp. 396–401.

Cross et al., "Optically Controlled . . . Switch", *IEEE J. of Quantum Electronics*, vol. QE-14, No. 8, Aug. 1978, pp. 577–580.

Gee et al., "Traveling-Wave Electrooptic Modulator", *Applied Optics*, vol. 22, No. 13, Jul. 1983, pp. 2034–2037.

*Introduction to Integrated Optics*, Plenum Press (New York, London), Chap. 14, "Acousto-Optical Interactions in Guided Wave Structures", E. G. H. Lean, pp. 411–413, 421–431, 437–441, 445–449, 454–455, (1974).

Cross et al., "Microwave Integrated Optical Modulator", Applied Physics Letters, 44 (5), Mar. 1, 1984, pp. 486–488.

S. Thaniyavarn, "A Novel Δβ Phase Reversal Mach-Zehnder Interferometer", TRW Electro Optics Research Center, 02/26-2/28/86.

R. Alferness, "Guided-Wave Devices for Optical Communication", IEEE Journal of Quantum Electronics, vol. QE-17, No. 6, Jun. 1981, pp. 946–959.

*Primary Examiner*—John D. Lee
*Attorney, Agent, or Firm*—Burns, Doane, Swecker & Mathis

[57] ABSTRACT

An optoelectronic directional coupler (1) has in a coupling area two parallel, coupled lightwave conductors (6a and 6b) with a length (L) as well as electrodes (5a and 5b). Each of the coupled lightwave conductors has one end connected to its individual output (7a and 7b) of the directional coupler (1). At their other ends the coupled lightwave conductors are each connected to its extra individual lightwave conductor (8a and 8b), the conductors (8a and 8b) being connected to the directional coupler input (9) via a fork branch. An incoming lightwave (P) is divided into two partial lightwaves (P1 and P2) by the extra wave conductors (8a and 8b). The partial lightwaves are in phase with each other and have the same effect in relation to each other at the inputs to the coupled lightwave conductors (6a and 6b). The partial lightwaves can be switched to either of the outputs (7a and 7b) with the aid of a control signal (S) connected between the electrodes (5a and 5b). The directional coupler has the advantage that the control signal (S) is a pure alternating voltage.

3 Claims, 4 Drawing Sheets

OPTOELECTRONIC DIRECTIONAL COUPLER FOR A BIAS-FREE CONTROL SIGNAL

TECHNICAL FIELD

The invention relates to an optoelectronic directional coupler for a bias-free control signal, the coupler including (a) two coupled lightwave conductors which are situated at mutual spacing and extend in a coupling area and are each connected to a wave conductor output on the directional coupler, (b) electrodes in the coupling area with the aid of which the optical coupling between the coupled lightwave conductors can be acted on with the aid of the control signal.

BACKGROUND ART

Optoelectronic directional couplers are used in many applications in modulating a lightwave or switching light signals in such as optical communication systems. A description of directional couplers is to be found in IEEE Journal of Quantum Electronics, vol. QE-12, No 7, July 1976, H. Kogelnik and R.V. Schmidt: ¢Switched Directional Couplers with Alternating $\Delta\beta$". The directional couplers are intended for two coupled lightwave conductors, which are generally connected to their individual inputs and outputs of the coupler. The optical coupling between the lightwave conductors can be acted on with the aid of an electrical signal which is connected to electrodes at the coupled lightwave conductors. The directional couplers of the prior art have a transfer function according to which it is required that the electrical signal has a direct voltage level, an electrical bias, about which the modulating signal varies. In high frequency modulation, with modulation frequencies of about 5 GHz or higher, there are problems in keeping this level constant. A varying bias can cause an optical signal to be incompletely coupled and sent from both outputs of the directional coupler. A Mach-Zender type of bias-free modulator is illustrated in Appl. Phys. Lett 43 (11), Dec 1983, C.M. Gee, G.D. Thurmond and H.W. Yen: "17 GHz band-width electro-optic modulator". This modulator has wo wave conductors between which an incoming lightwave is divided, the lightwave being relatively phase-shifted in the respective wave conductors. The modulator has the disadvantage that it only has one input and one output, so that there lacks the availability of switching a signal between two outputs.

DISCLOSURE OF INVENTION

The above-mentioned problems are avoided, in accordance with the invention, by a directional coupler which has two outputs, and also has no direct voltage component in its control signal.

BRIEF DESCRIPTION OF DRAWINGS

An embodiment of the invention will now be described in more detail below in connection with a drawing, where.

BEST MODES FOR CARRYING OUT THE INVENTION

Figure 1:
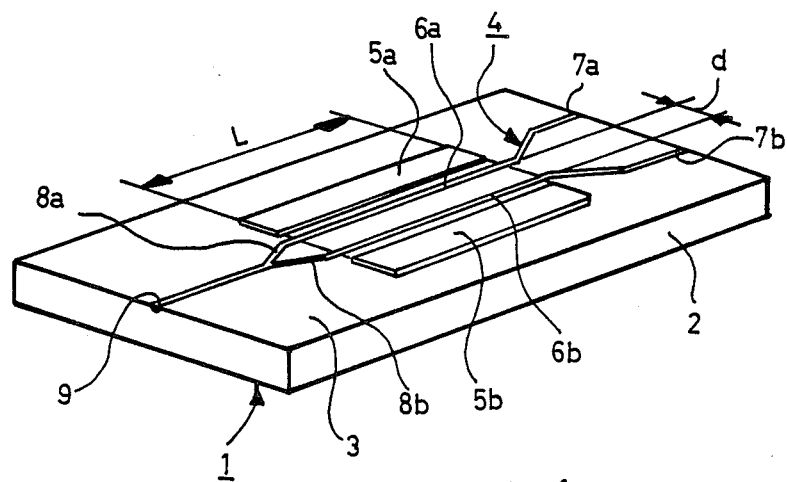
FIG. 1 illustrates an inventive direction coupler in perspective from above.

An embodiment of a directional coupler 1 in accordance with the invention is illustrated in FIG. 1. The coupler includes a wafer 2 of optoelectronic material, e.g. lithium niobate, which has wave conductor means 4 and electrodes 5a and 5b at its upper planar surface 3. The wave conductor means can be achieved by a process such as diffusing titanium into the wafer 2 to a desired depth. In a coupling area the wave a conductor means 4 has two parallel, coupled wave conductors 6a and 6b with a length L and situated at a mutual spacing d. This spacing is selected such that the light in one coupled wave conductor acts on the other coupler wave conductor and can migrate over to it. The coupling can be acted on with the aid of the electrodes 5a and 5b, which have the length L and extend along their respective coupled wave conductor 6a and 6b. At their ends the wave conductors are connected to their respective outputs 7a and 7b on the directional coupler 1. At their other ends the wave conductors 6a and 6b have their respective input connected to extra lightwave conductors 8a and 8b. The latter are connected to each other and to a wave conductor input 9 on the directional coupler 1 to form a fork branch.

Figure 2:
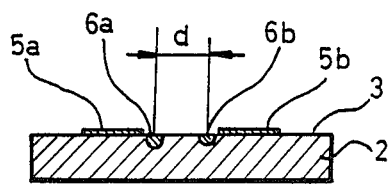
FIG. 2 is a cross section through the coupler of FIG. 1.

A cross section of the directional coupler 1 is illustrated in FIG. 2 with the diffused, coupled lightwave conductors 6a and 6b and the electrodes 5a and 5b on the upper planar surface of the wafer 2.

Figure 3:
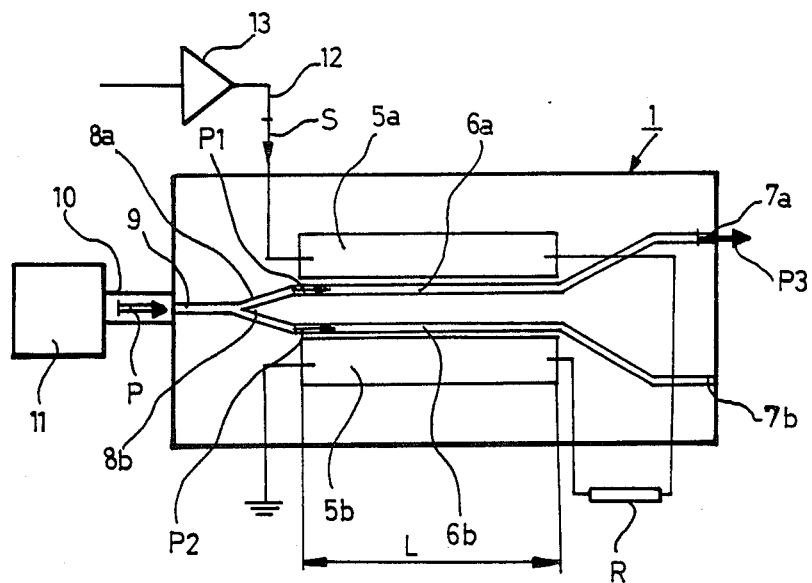
FIG. 3 is a plan view from above of the coupler in FIG. 1 showing it connected to a light source and a modulating voltage source.

The directional coupler 1 is shown in plan in FIG. 3. The wave conductor input 9 is connected by an optical fibre 10 to a schematically illustrated laser 11, which sends a light-wave P to the coupler. A conductor 12 connects the electrode 5a to a schematically illustrated signal source 13, which sends a controls signal S to the electrode 5a. The electrode 5b is connected to earth potential, and both electrodes, which are coupled as so-called traveling wave electrodes, are terminated reflection-free via a resistor R connected between them.

The incoming lightwave P is divided in the fork branch between the extra lightwave conductors 8a and 8b into two partial lightwaves P1 and P2. At the inputs to the coupled wave conductors 6a and 6b the partial lightwaves are in phase with each other, and the branch is formed such that the partial wave P1 has substantially the same power as the partial wave P2. If the control signal S=O, the partial lightwaves travel along the coupled wave conductors 6a and 6b and are sent from the outputs 7a and 7b. If the controls signal assumes a value S=VO, the coupling is acted on between the coupled lightwave conductors so that the partial lightwave P2 is switched from coupled lightwave conductors 6b to the coupled lightwave conductor 6a. An outgoing ligh signal P3 is sent from the wave conductor output 7a with the whole of the power of the incoming lightwave P. For the opposite sign of the control signal, S=-VO, the whole power of the incoming lightwave P is sent from the wave conductor output 7b.

Figure 4:
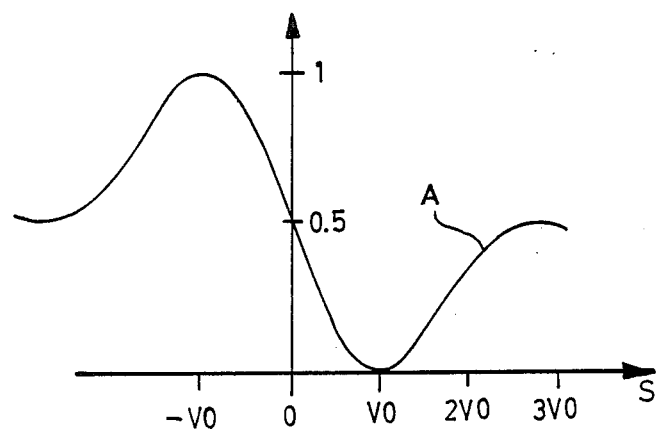
FIG. 4 is a diagram of a transfer function for the coupler in FIG. 1.

The transfer function A of the directional coupler 1 is given in FIG. 4, which illustrates in more detail how the power of the incoming lightwave P is distributed between the wave conductor outputs 7a and 7b in response to the strength of the control signal S.

It has been described above how the incoming lightwave P is divided and switched between the coupled lightwave conductors. For the signal voltage S=±VO the directional coupler 1 sends the incoming lightwave P completely from the output 7a or 7b. This takes place, however, solely with the provision that the length L of the coupling area is in a given relationship to a coupling length Lc for the coupled lightwave conductors 6a and 6b. By the coupling length Lc is intended here the length along the coupled lightwave conductors which is required for a lightwave in one conductor to be entirely switched over to the other conductor when the signal S=O. The condition applying for the directional coupler in FIG. 3 is that L=1√×2×Lc.

Figure 5:
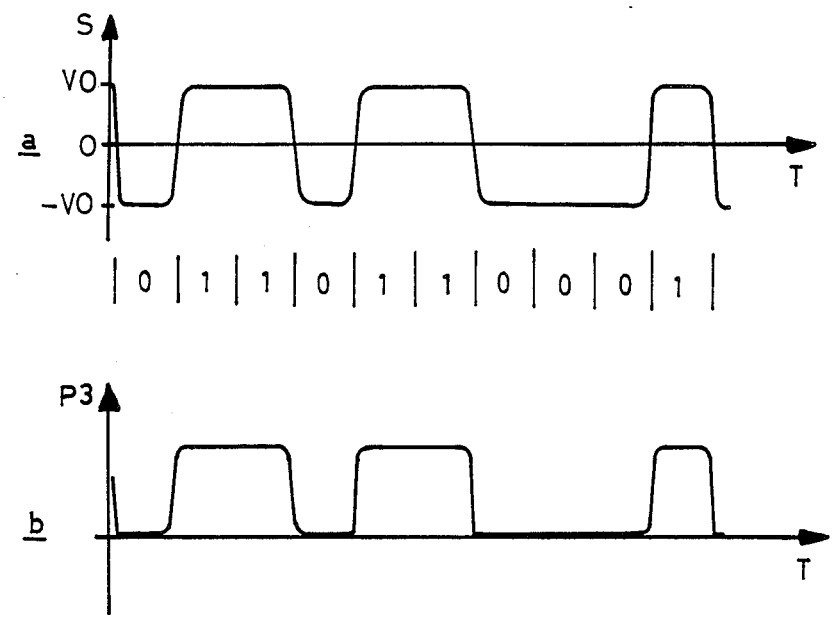
FIG. 5 shows diagrams of a modulating electrical signal and a corresponding modulated light signal.

An example is illustrated in FIG. 5 of how the lightwave P from the laser 11 is modulated with the aid of the control signal S. Here the FIG. 5a illustrates in a diagram how the control signal S varies with the time T between the voltages +Vo and −VO. The control signal represents information in the form of logical ones and zeros, as marked under the diagram. FIG. 5b illustrates the corresponding light signal P3, which is sent from the wave conductor output 7a.

Figure 6:
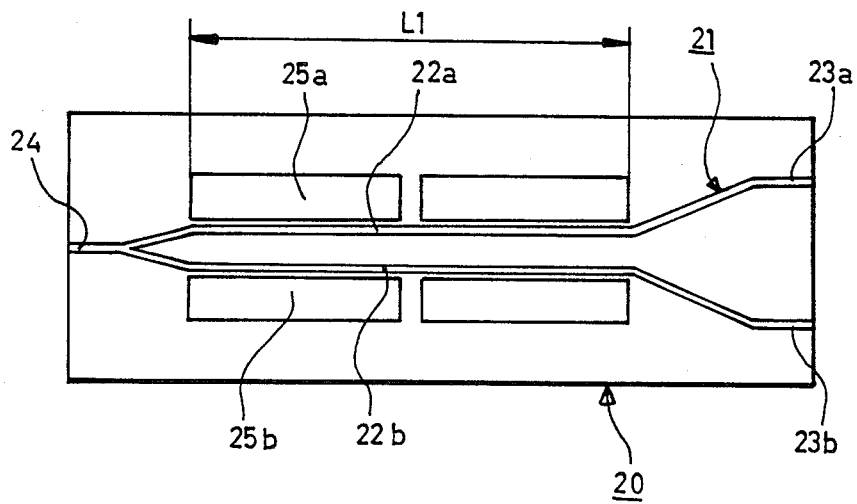
FIG. 6 is a plan view from above of the coupler according to FIG. 1 with an alternative implementation of the electrodes.

An inventive directional coupler 20 is illustrated in FIG. 6, and is provided with lightwave conductors 21 of the same implementation as for the directional coupler 1 described above. Two parallel, coupled lightwave conductors 22a and 22b of a length L1 extend over a coupling area. These coupled conductors have one end connected to the outputs 23a and 23b of the directional coupler 20, and at their other ends they are connected to each other and to the input 24 of the coupler via a fork branch. In the coupling area, the directional coupler 20 has electrodes 25a and 25b, which are divided into sections, there being two sections in the embodiment here. A more detailed description of this type of electrode is to be found in the article by H. Kogelnik and R.V. Schmidt cited above. By the division of the electrodes into sections, an electrical adjustment of the coupling between the coupled conductors 22a and 22b can be achieved. Accordingly an almost complete switching over of light from one or the other output is obtained, even if the length L1 deviates from the desired length, e.g. due to deficient manufacturing accuracy. For the directional coupler 20 the relationship: L1=1.85×Lc, where Lc is the above-mentioned coupling length.

Figure 7:
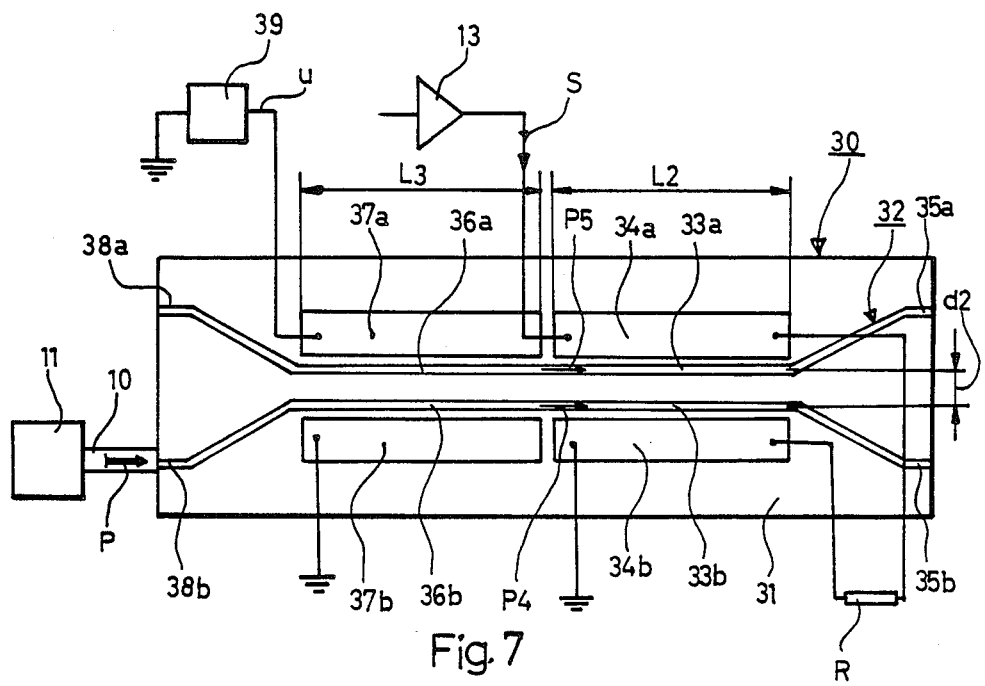
FIG. 7 is an alternative implementation of a directional coupler in accordance with the invention.

An alternative embodiment of a directional coupler 30 in accordance with the invention is illustrated in FIG. 7. The coupler includes a wafer 31 of optoelectronic material with a wave conductor means 32. In a coupling area the wave conductor has two parallel, coupled lightwave conductors 33a and 33b at a mutual spacing of d2 and with a length L2. The switching coupling between the coupled lightwave conductors can be acted on with the aid of two electrodes 34a and 34b, each extending along their respective conductors 33a and 33b. The latter are at one end connected to their individual outputs 35a and 35b on the directional coupler. At their other ends the conductors each have their input respectively connected to an extra lightwave conductor 36a and 36b. The latter are parallel and extend a length L3 in an extra coupling area in which light can be switched between the extra lightwave conductors. This switching can be acted on with the aid of extra electrodes 37a and 37b, which extend in the extra coupling area along their respective lightwave conductors 36a and 36b. These conductors are connected by their respective wave conductor inputs 38a and 38b on the directional coupler 30. The laser 11 is connected to the wave conductor input 38b via the optical fibre 10, and sends the lightwave P to this input. The lightwave P travels along the extra lightwave conductor 36b and is switched to the extra lightwave conductor 36a. The switching is controlled with the aid of a direct voltage source 39 connected between the electrodes. It is here desirable that the switching gives a partial lightwave P4 and P5, respectively, at the inputs to the coupled lightwave conductors 33a and 33b, so that the partial lightwave P4 substantially has the same power as the partial lightwave P5 and the mutual phaseshift between the partial waves is substantially 180°. A calculation of the coupled oscillations occuring between the extra lightwave conductors 36a and 36b illustrates that it is possible to select the extra coupling area length as L3, the distance d2 between the extra lightwave conductors and the output voltage U of the direct voltage source in such a way that this desire is met. The electrode 34a is connected to the signal source 13, the electrode 34b is connected to earth potential, and both electrodes are coupled as travelling wave electrodes and connected to each other via the resistor R. The signal source 13 sends the controls signal S for controlling the partial lightwaves P4 and P5 between the outputs 35a and 35b of the directional coupler 30 in a manner described above in connection with FIG. 3.

Figure 8:
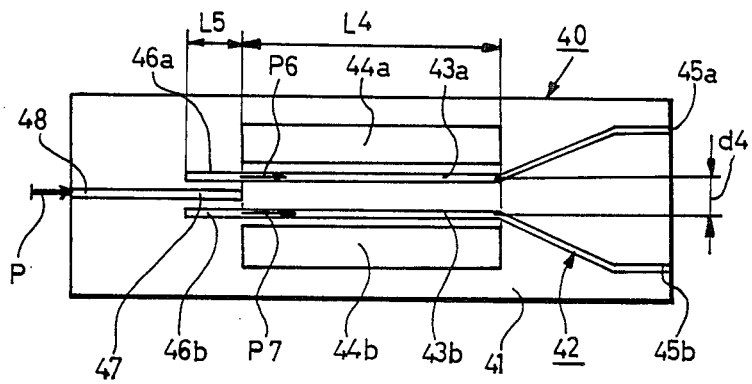
FIG. 8 is a still further alternative implementation of an inventive directional coupler.

A still further alternative embodiment of a directional coupler 40 in accordance with the invention is illustrated in FIG. 8. Similar to the embodiments described above, the directional coupler 40 has a wafer 41 of optoelectronic material having on its upper surface a wave conductor means 42. In a coupling area, the wave conductor means has two parallel, coupled lightwave conductors 43a and 43b with a length of L4 with a mutual spacing of d4, and also electrodes 44a and 44b. The conductors 43a and 43b are at one end each connected to their outputs 45a and 45b on the directional coupler and at their other ends they have an input connected to extra lightwave conductors 46a and 46b. These extra conductors are parallel and extend in an extra coupling area of a length L5. Half way between the extra conductors 46a and 46b there extends a light distributing lightwave conductor 47 which is connected to the input 48 on the directional coupler 40. The lightwave P coming to this input is distributed by coupled oscillations of the light distributing lightwave conductor 47 between the extra lightwave condutors 46a and 46b. The whole of the light energy in the light wave P is switched to the extra lightwave conductors, which send respective partial lightwaves P6 and P7 at the inputs to the coupled lightwave conductors 43a and 43b. These partial lightwaves are in mutual phase, and in relation to each other they have substantially the same power. The partial lightwaves can be coupled between the outputs 45a and 45b of the directional coupler 40 with the aid of the electrodes 44a and 44b, as described in connection with FIG. 3 above.

The inventive directional couplers described above have the advantage that they have a relatively high upper boundary frequency, in the order of magnitude 7 GHz, at a relatively low modulation voltage S. This modulation voltage does not have a direct voltage component and is therefore comparatively simple to generate. The embodiments according to FIGS. 3 and 8 have the advantage that the coupling area L and L4, respectively, is short, so that the optelectronic wafer 2 and 41 is small and there are no extra electrodes which are biased with a direct voltage. Their disadvantage is that they only have one input 9 and 48, respectively, so that it is not possible to cross-couple two light signals with the air of one directional coupler. The embodiment according to FIG. 7 has the advantage that it can have two inputs 38a and 38b. Its disadvantage is that it requires a direct voltage and that it has two coupling area L2 and L3 with electrodes, which means that the directional coupler 30 requires a large optelectronic wafer 31.

In the illustrated embodiments the directional coupler has a wafer 2, 31, 41 with an orientation of the crystalline axes such that the light is propagated in the direction of the optical axis. It is possible to apply the invention on directional couplers with an orientation of the crystalline axes which deviates from this. However, the electrodes then have an implementation adjusted to this deviating crystalline orientation and an appearance deviating from the electrodes illustrated in the Figures.

I claim:

1. Optoelectronic directional coupler including a) two mutually spaced, coupled led lightwave conductors extending in a coupling area, the conductors each being connected to a waveguide output on the directional coupler and two electrodes in the coupling area, with the aid of which the optical coupling between the coupled conductors can be acted on with the aid of a control signal, b) extra lightwave conductors, of which at least one is in communication with a wave conductor input on the directional coupler, the extra lightwave conductors being arranged such that an incoming lightwave on the directional coupler wave conductor input is divided between the extra lightwave conductors into two partial lightwaves, each having substantially the same power and being in phase with the other, or being phase-shifted half a revolution in relation to the other, characterized in that the coupled lightwave conductors (6a, 6b; 22a, 22b; 33a, 33b; 43a43b) are each connected to one of the extra lightwave conductors (8a, 8b; 36a, 36b; 46a, 46b) and in that the incoming lightwave (P) can be switched between the outputs (7a, 7b; 35a; 35b, 45a, 45b) of the directional coupler (1;30;40) by the partial lightwaves (P1,P2;P4,P5;P6,P7) being switched between the coupled lightwave conductors with the aid of the control signal (S) connected to one of the electrodes (5a; 34a; 44a), the signal assuming a positive (+VO) or a negative (−VO) potential on switching, in relation to a reference potential to which the other electrode (5b; 34b; 44b) is connected, the positive potential (+VO) having substantially the same numerical value as the negative potential (−VO).

2. Optoelectronic directional coupler as claimed in claim 1, where each of the coupled lightwave conductors has a continuous electrode, characterized in that the electrodes have a length L for which the relationship $L = 12\sqrt{2}\, Lc$ is applicable where Lc is one coupling length for the coupled lightwave conductors (6a, 6b; 33a, 33b; 43a43b).

3. Optoelectronic directional coupler as claimed in claim 1, where each of the coupled lightwave conductors has an electrode which is divided into two substantially equally as long sections, characterized in that the electrodes have a length L1 for which the relationship $L1 = 1.85 \times Lc$ is applicable, where Lc is one coupling length for the coupled lightwave conductors (22a, 22b).

* * * * *